United States Patent [19]
Ishii et al.

[11] Patent Number: 6,129,281
[45] Date of Patent: Oct. 10, 2000

[54] INFORMATION READING APPARATUS

[75] Inventors: Mitsuharu Ishii; Toshimitsu Kumagai; Yuichirou Takashima, all of Kawasaki, Japan

[73] Assignee: Fujitsu Limited, Kawasaki, Japan

[21] Appl. No.: 09/375,392

[22] Filed: Aug. 17, 1999

Related U.S. Application Data

[62] Division of application No. 08/758,826, Dec. 4, 1996, Pat. No. 5,992,747.

[30] Foreign Application Priority Data

Mar. 27, 1996 [JP] Japan ................................. 8-072310

[51] Int. Cl.⁷ ........................................................ G06K 7/10
[52] U.S. Cl. .............................. 235/462.43; 235/472.01
[58] Field of Search ............................ 235/462.43, 472.01

[56] References Cited

U.S. PATENT DOCUMENTS

| | | |
|---|---|---|
| 3,978,318 | 8/1976 | Romeo et al. . |
| 4,766,297 | 8/1988 | McMillan . |
| 5,092,793 | 3/1992 | Stephan . |
| 5,177,345 | 1/1993 | Baitz . |
| 5,260,552 | 11/1993 | Colbert et al. . |
| 5,314,631 | 5/1994 | Katoh et al. . |
| 5,340,973 | 8/1994 | Knowles et al. . |
| 5,371,348 | 12/1994 | Kumar et al. . |
| 5,406,063 | 4/1995 | Jelen . |
| 5,412,193 | 5/1995 | Swartz et al. . |
| 5,448,046 | 9/1995 | Swartz . |
| 5,574,272 | 11/1996 | Seo et al. . |
| 5,591,953 | 1/1997 | Rockstein et al. . |
| 5,612,530 | 3/1997 | Sanders et al. . |
| 5,691,528 | 11/1997 | Wyatt et al. . |
| 5,786,584 | 7/1998 | Button et al. . |
| 5,793,604 | 8/1998 | Koenck et al. . |
| 5,992,747 | 11/1999 | Katoh et al. ...................... 235/462.43 |

FOREIGN PATENT DOCUMENTS

| | | |
|---|---|---|
| 5-120464 | 5/1993 | Japan . |
| 6-103395 | 4/1994 | Japan . |

*Primary Examiner*—Harold I. Pitts
*Attorney, Agent, or Firm*—Arent Fox Kintner Plotkin & Kahn PLLC

[57] ABSTRACT

In a bar-code reading apparatus, an enclosure is provided with various mechanisms, includes a hand-holding portion and a reading portion having a reading window. Projections are provided at two sides of the enclosure, and a cable extends out from one of the projections. The projections engage with supporting-point cut-out portions of supporting portions in a stand, in a stationary condition. The reading window is therefore located lower than the hand-holding portion.

2 Claims, 7 Drawing Sheets

INFORMATION READING APPARATUS

This application is a divisional application filed under 37 CFR § 1.53(b) of parent application Ser. No. 08/758,826, filed on Dec. 4, 1996 now U.S. Pat. No. 5,992,747.

BACKGROUND OF THE INVENTION

1. Field of the Invention

The present invention relates to an information reading apparatus, and, in particular, to an information reading apparatus for reading information such as a bar code provided on a label.

Recently, the number and type of goods having bar code labels provided thereon have significantly increased. The bar codes are used for goods classification, selection, pricing and accounting when goods are sold, and so forth, and are typically read by optical reading devices such as a portable type, a stationary type, and a combination portable/stationary type. For combination portable/stationary type readers, it is necessary that the readers have configurations which can easily be held in the hand of a user, and effectively used in a stationary condition.

2. Description of the Related Art

Bar-code reading apparatuses for reading bar codes include contact type and non-contact type. Non-contact type bar-code reading apparatuses are typically of the laser type. Laser type bar-code reading apparatuses emit laser scanning light to bar codes, and then detect light reflected by the bar codes and thus read the bar codes. Laser type bar-code reading apparatuses can be portable, stationary, and combination portable/stationary type. Combination portable/stationary type will be discussed below.

Figure 9:
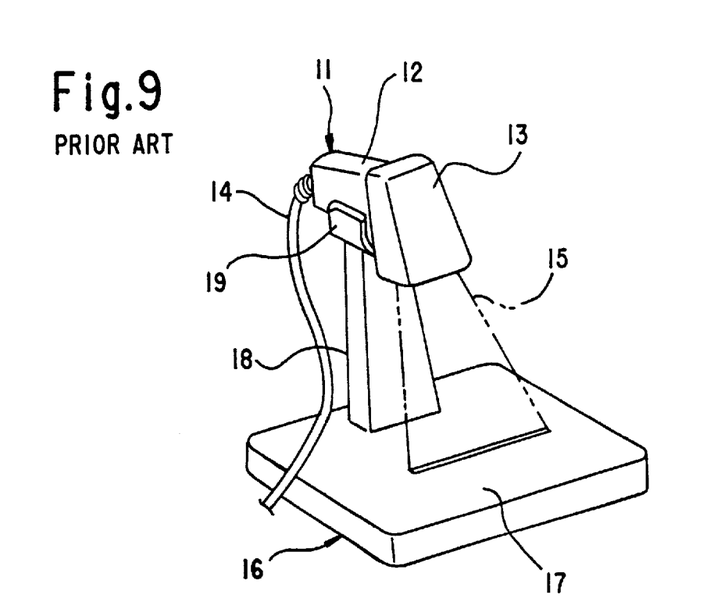
FIG. 9 shows a perspective view of a hand scanner in the prior art in a stationary condition.

FIG. 9 shows a perspective view of a prior art combination portable/stationary scanner in a stationary condition. This hand scanner 11 includes a hand-holding portion 12 and a reading portion 13. A cable 14 extends from the rear end of the hand-holding portion 12 and is connected to a point-of-sale (POS) system (not shown, but which could include cash registers, computers, terminals, etc.). Within the hand-holding portion 12 and reading portion 13, a reflected-light detecting mechanism is provided. Laser light emitted by a laser diode is provided to scanning means such as a polygon mirror, and the scanning means causes the laser light to scan in a plurality of directions, and thus the laser light is externally emitted through a reading window of the reading portion 13 as scanning light 15.

When scanning light 15 is incident on a bar code, the light is reflected by the bar code, passes through the reading window of the reading portion 13, and is incident on a photodiode in the reading portion 13. The light incident on the photodiode is converted into an electric signal therethrough. This electric signal based upon the bar code is processed by a CPU and then is supplied to the above-mentioned POS system. The bar code has an alternating arrangement of bar portions and space portions, which arrangement is standardized by UPC (Universal Product Code), EAN (European Article Code), JAN (Japan Article Number (code)) or a similar code protocol.

In situations where the hand scanner 11 is used in a stationary condition, a stand 16 is used. In the stand 16, a supporting portion 18 is vertically fixed on a reading table 17. A placement portion 19 is formed on the top of the supporting portion 18, and the hand-holding portion 12 of the hand scanner 11 is placed on the placement portion 19. An operator faces the stand 16. When the hand scanner 11 is placed on the stand as shown in FIG. 9, the laser scanning light is emitted toward the reading table 17 from the reading window of the reading portion 13.

Figure 10A:
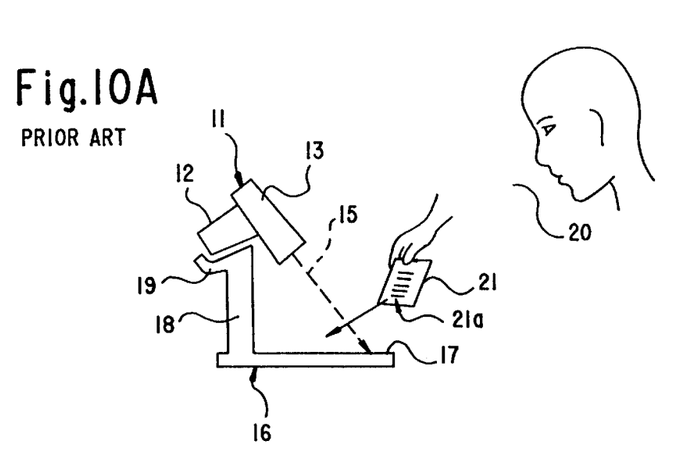
FIGS. 10A and 10B illustrate a use condition of the FIG. 9 arrangement.
Figure 10B:
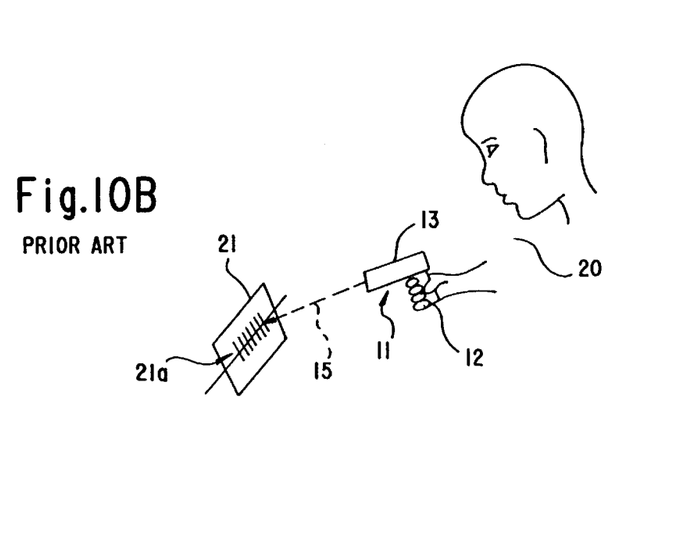

FIGS. 10A and 10B illustrates situations in which the hand scanner 11 is used. FIG. 10A illustrates a case in which the hand scanner 11 is used in a condition in which the hand scanner 11 is placed on the stand 16. In this case, as shown in the figure, the laser scanning light 15 is emitted in a direction to the side of an operator 20 from the reading portion 13 of the hand scanner 11. The operator 20 holds a label 21, or an article having the label 21 provided thereon, on which a bar code 21a is provided, and causes the label 21 to block the laser scanning light 15 in a condition where the surface of the label 21 having the bar code 21a provided thereon faces the reading portion 13. Thereby, the bar code 21a reflects the laser scanning light 15, the reflected light is incident into the reading portion 13, and thus the reflected light is used in the reading portion 13 to read the bar code 21a.

FIG. 10B illustrates a situation where the operator 20 holds the hand scanner 11 by his or her hand. In this situation, the operator 20 holds the hand-holding portion 12, aims the reading window of the reading portion 13 at the bar code 21a portion of the label (article) 21, and causes the reading portion to emit the laser scanning light.

Figure 11A:
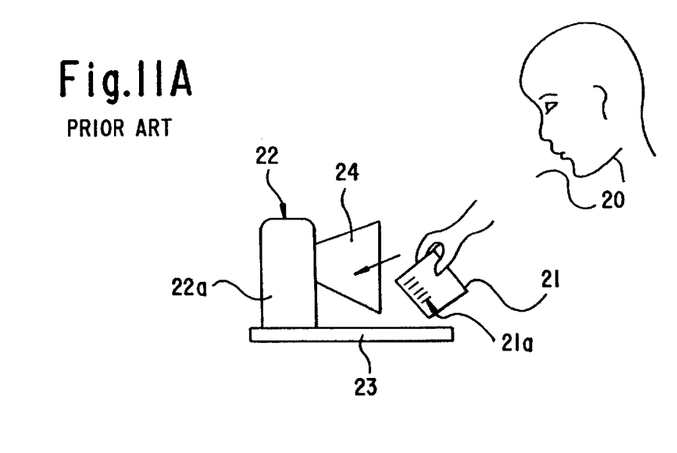
FIGS. 11A and 11B illustrate another hand scanner of the prior art.
Figure 11B:
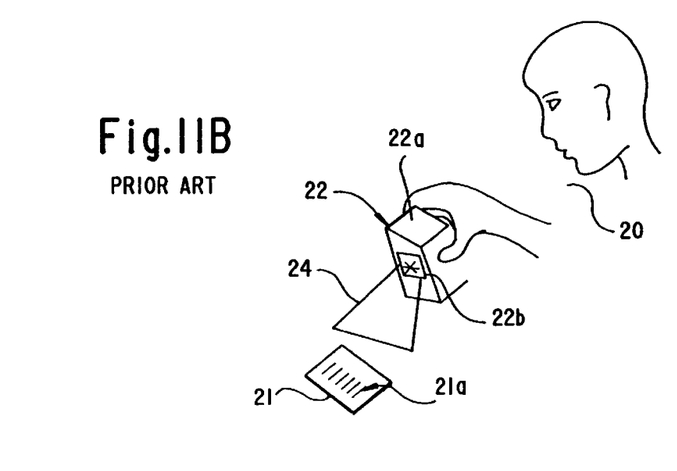

FIGS. 11A and 11B illustrate a hand scanner having another configuration in the prior art. Hand scanner 22 is a stationary one. The hand scanner 22 has a box-shaped enclosure 22a and can be simply set on a reading table 23 by itself without needing a stand such as the abovementioned stand 16. Further, the hand scanner 22 has a width which is set to be small enough that operator 20 can hold it by his or her single hand. As shown in FIG. 11B, the hand scanner 22 has a reading window 22b at one side wall thereof. Laser scanning light 24 is emitted in a direction of that side, as shown in FIG. 11B, through the reading window 22b. When using the hand scanner 22, as shown in FIG. 11A, the operator 20 positions the bar code 21a portion of the label or article 21 at a position such that the laser scanning light 24 emitted by the scanner 22 which is set on the reading table 23 is incident on the bar code 21a portion. The bar code 21a can therefore be read.

FIG. 11B illustrates a situation where the enclosure 22a of scanner 22 is held by the operator 20 in a state in which the reading window 22b faces externally. In this case, the laser scanning light 24 emitted from the reading window 22b is caused to be incident on the bar code 21 a portion of the label or article 21. The bar code 21 a is thereby read.

Referring to the configuration shown in FIG. 10A, when the hand scanner 11 is used in a stationary condition, the reading window of the reading portion 13 is positioned in the direction of the operator 20, while the hand-holding portion 12 is positioned at a position farther from the operator 20. In a situation where the operator 20 then desires to hold the hand-holding portion 12 by hand to use the hand scanner 11 in a hand-held condition such as that shown in FIG. 10B, the operator 20 must pass the hand scanner 11 from one hand to the other in order to change the orientation of the hand scanner 11. Thereby, the operator 20 can use the hand scanner 11 in the situation shown in FIG. 10B. In fact, as shown in FIGS. 10A and 10B, the orientations of the hand scanner 11 are reverse to one another with respect to the spatial relationship with the operator 20. Otherwise, the operator 20 needs to extend his or her hand to the back side of the hand scanner 11 and directly hold the hand-holding portion 12 so as to change the orientation of the hand scanner 11. A similar difficulty occurs with scanner 22 shown in FIGS. 11A and 11B. When using the scanner 22 in the hand-held condition after using the same in the stationary condition, the operator 20 either needs to pass the scanner 22 from one hand to the other or needs to extends his or her hand to the back side of the scanner 22, hold it directly, and thereby change the orientation of the scanner 22. Due to these configurations, the hand scanners 11 and 22 in the prior art are troublesome when used as hand held scanners. Further, the cable 14 extending from the rear end of the hand-holding portion 12 is also troublesome when the operator 20 holds the hand-holding portion 12, because the cable 14 prevents the operator 20 from freely holding the hand-holding portion 12 and also from freely moving the hand scanner 11.

The present invention has been developed in view of these problems, and an object of the present invention is to provide an information reading apparatus which has improved features such that an operator can easily handle the apparatus, without encountering difficulties in handling caused by the cable or by the relationship of the stationary reading position and the handheld position.

SUMMARY OF THE INVENTION

The present invention includes an information reading apparatus wherein the enclosure is provided with a mechanism for reading the optical mark having a reading window formed thereon. The window is shaped so that it is located lower than a portion to be held by hand in the stationary condition. Thereby, when the stationary condition is transferred into the hand-held condition from the stationary condition, the operator merely needs to hold the portion to be held by hand from the upper side. Therefore, the ease of handling the apparatus in the hand-held condition is improved.

The portion to be held by hand can be provided as the hand-holding portion separate from the reading window, and the hand-holding portion can be formed to have the curved surface or to be bent toward the operator. Thereby, the operator can easily hold the hand-holding portion by hand, without switching hands and without uncomfortably reaching around to the back of the scanner.

In another embodiment of the invention, a wiring means or cable extends out from the side portion of the enclosure so that the operator can hold the enclosure. Further, the wiring means extends out from the supporting center of the enclosure so that the axis of the wiring means is coincident with the supporting center of the enclosure at the cable extending origin point. Therefore, as the enclosure is rotated about the supporting center, the cable merely turns about its axis accordingly but may not swing at the cable extending origin point. Further, a supporting member having a maintaining portion is provided to the enclosure rotatably. The maintaining portion maintains the wiring means in a particular position. Thereby the wiring means can be prevented from obstructing the operator from holding the enclosure, which acts to improve the ease of handing of the apparatus.

In further embodiments of the invention, projections are formed at the two sides of the enclosure on the side of the center of gravity of the apparatus upon which the hand held portion is disposed. The projections rotatably engage with the stand. Thereby, the reading window is always located lower than the portion to be held by hand in the stationary condition, which improves ease of handling of the apparatus.

One projection of the projections engaging with the stand can be rotatably provided with the supporting member and also can be fixed to the enclosure, or the supporting member can be fixed to the projection and also the projection can be rotatably provided to the enclosure. Further, for example, a corresponding engagement portion is provided on the projection for engaging with an engagement portion of the stand. Thereby, the wiring means can be maintained in a particular position and the maintaining position can be rotated with respect to the stand, or the stationary condition angle of the enclosure can be changed and also the maintaining position can be changed, individually. This configuration also improves the ease of handling of the device.

A further embodiment of the invention is one where a positioning member is provided to the stand, and the enclosure can be rotatably positioned. It is possible to surely perform the optical mark reading in the stationary condition. Indication portions are provided in yet another embodiment, in the enclosure at the positions visible in the stationary condition and hand-held condition. These indication portions indicate the optical mark reading. Thereby, the reading can be positively performed.

The reading window and the center of gravity can be configured to be in the same side of the enclosure with respect to the supporting center so that, when an operator stops holding the enclosure, the enclosure automatically turns, by the force of gravity, into an orientation in which the reading window is located below the supporting center. By providing the reading window so that the window surface thereof extends approximately vertically when the reading window is located below the supporting center, the reading window can then face a label to be read, when the label is held toward the side of the enclosure.

DETAILED DESCRIPTION OF THE PREFERRED EMBODIMENTS

Figure 1A:
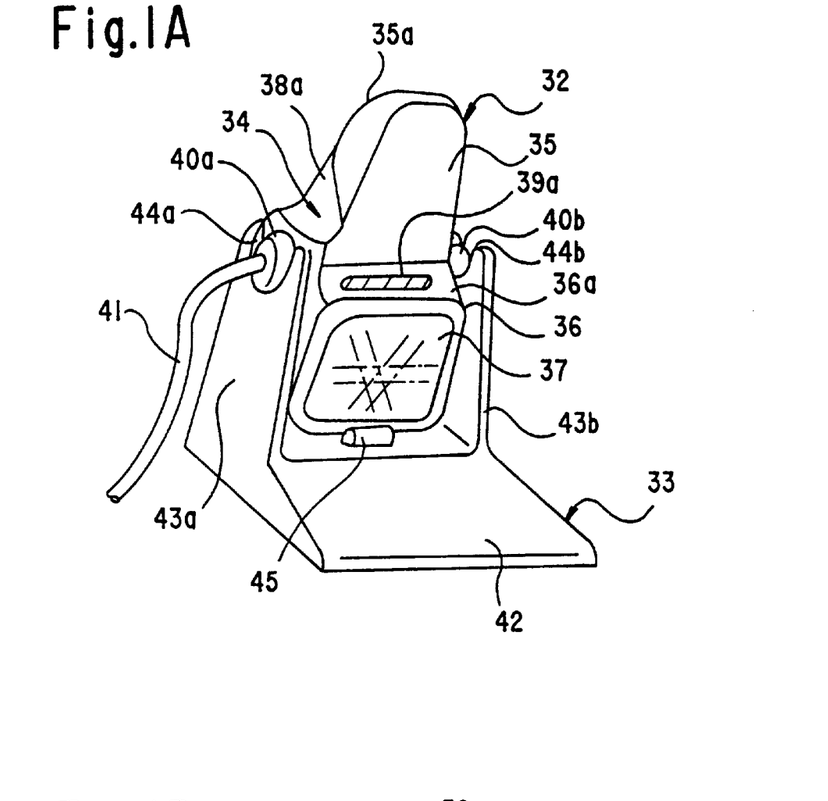
FIGS. 1A and 1B show perspective views of an arrangement of a first embodiment of the present invention.
Figure 1B:
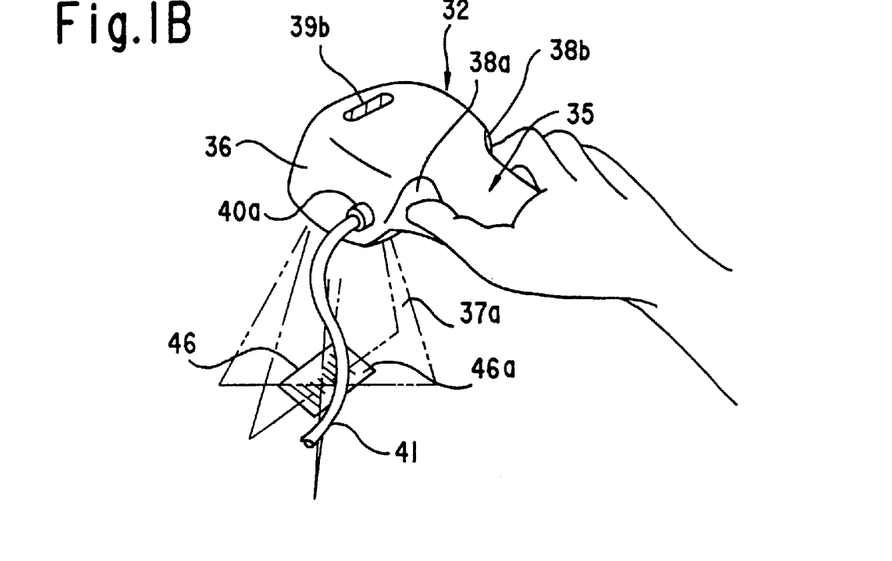

FIGS. 1A and 1B show perspective views of an information reading apparatus in a first embodiment of the present invention. The information reading apparatus includes a bar-code reading apparatus or hand scanner 32 and a stand 33, as shown in FIG. 1A. The bar-code reading apparatus 32 reads bar codes in a non-contact condition, in which the apparatus 32 does not come into contact with bar-code labels. The bar-code reading apparatus 32 is capable of being used as a stationary device and as a hand-held device. Thus, the bar-code reading apparatus 32 can be used for reading bar codes in a stationary condition in which the bar-code reading apparatus 32 is placed on the stand 33 as shown in FIG. 1A. The bar-code reading apparatus 32 can also be used for reading bar codes in a hand-held condition in which, as shown in FIG. 1B, an operator has removed apparatus 32 from a stand 33 and then holds bar-code reading apparatus 32 in the operator's hand.

In FIGS. 1A and 1B, in the bar-code reading apparatus 32, a mechanism (which will be described later) for reading optical marks is provided inside an enclosure 34. The bar-code reading apparatus 32 includes a hand-holding portion or handle 35, and a reading portion 36. A reading window 37 is formed in one side of the reading portion 36. A light pattern, shown in FIG. 1B, emitted from the reading window 37, is a scanning light pattern for reading bar codes. The hand-holding portion 35 is formed of a curved-surface portion 35a shaped like an arc at its projecting end in a side opposite to the side of the reading portion 36. Furthermore, depressions 38a and 38b are formed in the hand-holding portion 35, to make it easy and comfortable to hold by hand, on two opposite sides in a boundary portion between the hand-holding portion 35 and reading portion 36.

An LED indication portion 39a is provided at a ramp surface 36a between the reading portion 36 and hand-holding portion 35. This LED indication portion 39a is provided on the same side of the enclosure 34 on which side the reading window 37 is provided, as shown in FIGS. 1A and 1B. Thereby, this LED indication portion 39a can be viewed by an operator when the apparatus is in the stationary condition. Further, another LED indication portion 39b is formed on a side opposite to the side of the reading window 37 and performs an indication the same as an indication of the LED indication portion 39a. This LED indication portion 39b is provided on the rear side of the enclosure 34 so that this LED indication portion 39b can be viewed by an operator when the apparatus is in the hand-held condition. Further, projections 40a and 40b are integrally formed on two opposite ends of the enclosure 34. A cable 41 acting as electric wiring means is drawn out from the projection 40a.

In the stand 33, two supporting portions 43a, 43b are integrally formed to stand at two opposite sides of a reading table 42, respectively. A distance between the two supporting portions 43a, 43b is approximately the same as the width of the enclosure 34 of the bar-code reading apparatus 32. Supporting-point cut-out portions 44a and 44b are formed at the tops of the supporting portions 43a and 43b, respectively. The projections 40a and 40b of the bar-code reading apparatus 32 are engage the supporting-point cut-out portions 44a and 44b when the apparatus 32 is placed on the supporting portions 43a and 43b. Thereby the bar-code reading apparatus 32 is rotatably supported on the stand 33. The projections are positioned with respect to the center of gravity of apparatus 32 such that the reading window will pivot downward into a stationary reading position.

A projecting stopper 45 acting as a positioning member is formed between the supporting portions 43a and 43b of the stand 33, and effectively positions the rotating bar-code reading apparatus 32 (enclosure 34). Thereby, the position of the reading window 37 is set to be in the stationary reading position.

Figure 2:
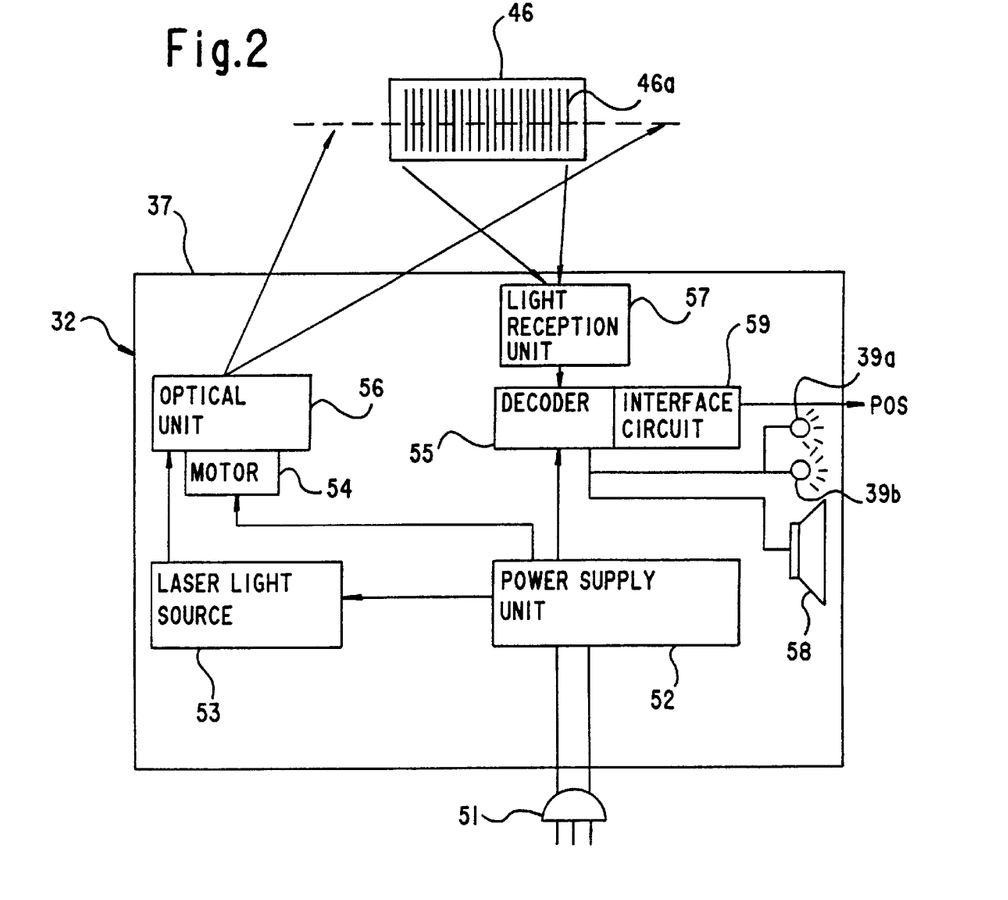
FIG. 2 shows an internal block diagram of an apparatus shown in FIGS. 1A and 1B.

FIG. 2 shows an internal block diagram of the bar-code reading apparatus 32. As shown the figure, in the bar-code reading apparatus 32, power is supplied from an external power source to a power supply unit 52 via a plug cable 51. The power supply unit 52 converts the supplied AC power into DC power and supplies the converted power to a laser light source 53, a motor 54, and a decoder 55. The laser light source 53 is provided with a laser diode which emits laser light to an optical unit 56 which includes, for example, a polygon mirror.

The polygon mirror 56 is revolved by the motor 54, and thus reflects the incident laser light in a plurality of scanning directions. The reflected laser light is thus emitted to a label 46 having bar code 46a thereupon, via the reading window 37.

Light reflected by the bar code 46a is received by the light reception unit 57 which converts the received light into an electric signal. The electric signal, as bar-code data, is transmitted to the decoder 55. The decoder 55 demodulates the bar-code data. When the demodulation is finished, the decoder 55 causes a speaker 58 to generate a finish sound and also causes the LED indication portions 39a and 39b to light and thus informs an operator of the completion of the demodulation. Further, the decoder 55 transmits the demodulated signal to an external POS (Point of Sale) system via an interface circuit 59.

The cable 41 shown in FIG. 1 includes the plug cable 51 and also an electric wiring for transmitting the demodulated signal to the POS system.

Figure 3:
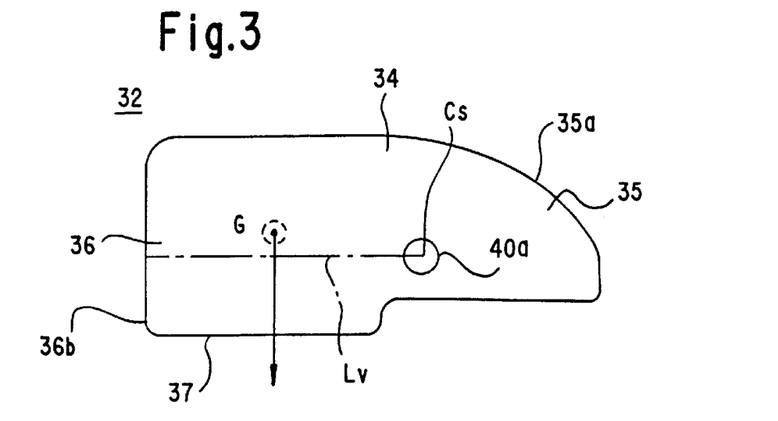
FIG. 3 illustrates a special relationship between the center of gravity and a stand engagement position of the bar-code reading apparatus as shown in FIG. 1A.

FIG. 3 shows a spatial relationship between the center of gravity of the bar-code reading apparatus 32 and a stand engagement position. FIG. 3 shows an approximate side elevational view of the bar-code reading apparatus 32. In a case where the center of gravity G of the apparatus 32 is located at approximately the center of the reading portion 36, the projections 40a and 40b are located to the side of the hand-holding portion 35 nearer than the center of gravity G. The projections 40a and 40b engage with the supporting-point cut-out portions 44a and 44b of the supporting portions 43a and 43b of the stand 33, respectively.

Further, as shown in FIG. 3, a straight line Lv is a normal of an end surface 36b of the reading portion 36, which surface is perpendicular to the longitudinal direction of the enclosure 34. The normal Lv is a straight line intersecting the supporting center Cs of the enclosure 34, about which center the enclosure is rotatable when the apparatus 31 is in the stationary condition and thus the projections 40a and 40b are inserted in the supporting-point cut-out portions 44a and 44b, respectively. As shown in FIG. 3, the center of gravity G is located in the side of the normal Lv in the enclosure opposite to the side in which the reading window 37 is provided. Thereby, when an operator stops holding of the hand-held portion 35 of the enclosure 34, due to the gravity being applied to the enclosure 34, the enclosure 34 tends to turn on the supporting portions 43a, 43b of the stand 33 into a position or an orientation in which the reading window 37 faces obliquely upward.

Therefore, in a stationary condition in which the bar-code reading apparatus 32 is rotatably placed upon the stand 33, due to the position of the center of gravity G, the bar-code reading apparatus 32 rotates about the projections 40a and 40b because of the force of gravity. As a result, the reading window 37 of the reading portion 36 is positioned lower than the hand-holding portion 35. At this time, the stopper 45 comes into contact with the lower-positioned reading portion 36 and thus positions the reading portion 36. Thus, the reading window 37 faces the side of the reading table 42 of the stand 33 and is used for identifying a bar-code of a label positioned over the reading table 42. In this case, the reading window 37 is positioned to be oblique to the straight line laying between the projections 40a, 40b and center of gravity G. Thereby, when the bar-code reading apparatus 32 is set on the stand 33, light emitted from the reading window 37 is emitted toward the surface of the reading table 42. As described above, due to the force of gravity acting upon enclosure 34, the enclosure pivots on the supporting portions 43a, 43b of the stand 33 into a position or an orientation in which the reading window 37 faces obliquely upward after an operator releases the hand-holding portion 35 of the enclosure 34. Then, the stopper 45 prevents the enclosure 34 from further turning after the enclosure has reached the position in which the reading window 37 faces obliquely downward, as shown in FIG. 1A. Thereby, the light then emitted from the reading window 37 is directed obliquely downward toward the reading table 42.

Figure 4A:
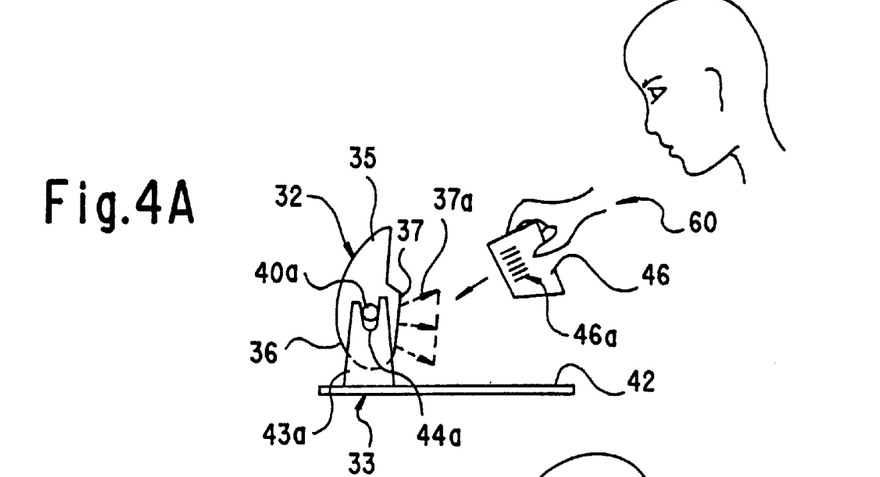
FIGS. 4A–4C illustrate use conditions of the apparatus shown in FIGS. 1A and 1B.

FIGS. 4A and 4B illustrate use conditions of the information reading apparatus 32 shown in FIGS. 1A and 1B. In FIG. 4A, in which the bar-code reading apparatus 32 is in the stationary condition on the stand 33, an operator 60 holds and positions a an article having label 46 provided thereon, on which a bar code 46a is described, over the reading table 42, within the range of a laser scanning light 37a emitted from the reading window 37. Thereby, reading of the bar code 46a can be performed by the bar-code reading apparatus 32. The operator 60 can be informed of completion of the bar-code reading by hearing the completion sound and also by seeing the reading window 37 side LED indication portion 39a of the LED indication portions 39a and 39b.

Figure 4B:
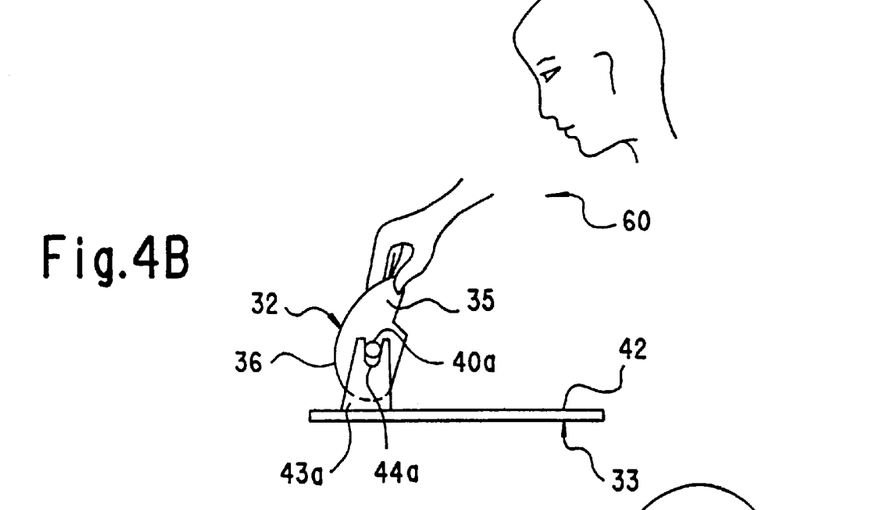
Figure 4C:
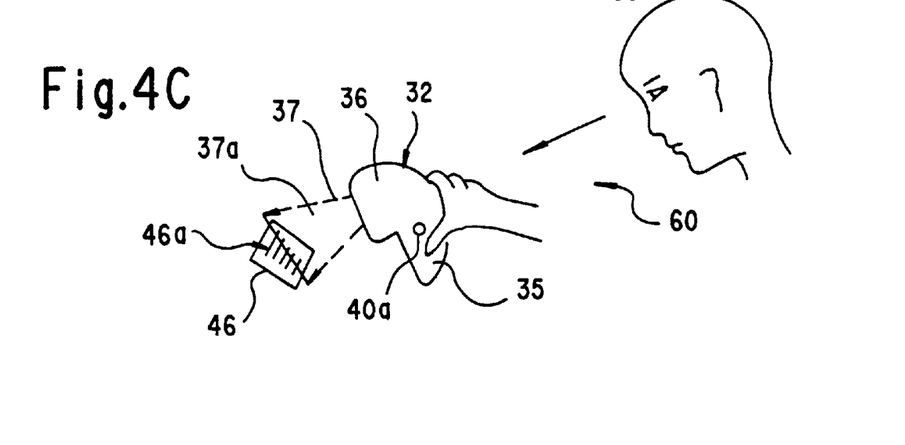

When the bar-code reading apparatus 32 is used in a hand-held condition, as shown in FIG. 4B, the operator 60 manually picks up the upper-positioned hand-holding portion 35 from the stand 33 by directly rotating and lifting the hand-holding portion 35 from the top. Thus, as a result of the rotation of the enclosure 34, the operator 60 causes the reading window 37 to face outward. In this position of the enclosure 34, it is possible that the apparatus 32 is in a condition where bar-code reading can be performed in the hand-held condition. Thus, as shown in FIG. 4C and FIG. 1B, the operator 60 holds the hand-holding portion 35 of the bar-code reading apparatus 32, causes the reading window 37 to approach the bar code 46, and immediately causes the apparatus 32 to emit the laser scanning light 37a via the reading window 37 to the bar code 46a and thus read the bar code 46a. In this case, the operator 60 can be informed of the finish of the bar-code reading by seeing the LED indication portion 39b, at the side opposite to the side of the reading window 37, of the LED indication portions 39a and 39b.

As a result of this configuration, the operator 60 can perform a transferring operation from a stationary condition to a hand-held condition without a troublesome hand operation such as passing from one hand to the other. It is therefore possible to achieve easy handling of the apparatus in any condition.

Cable 41 extends from the side of the enclosure 34 at a position on a supporting axis about which the enclosure 34 is rotatable on the supporting portions 43a, 43b of the stand 33 in the stationary condition. The axis of the cable 41 is then coincident with the supporting center of the enclosure 34 at the cable extending origin point. As a result, when the enclosure is rotated about the supporting center on the supporting portions 43a, 43b of the stand 33, the cable 41 merely turns about its axis but does not swing in an arc so as to prevent the operator from easy handling of the apparatus 32, by interfering with grabbing or lifting of apparatus 32. The cable 41 cannot, therefore, prevent easy handling of the apparatus 32 when the hand-holding portion 35 is held by the operator 60. Smooth transfer of the apparatus from the stationary condition to the hand-held condition can be achieved. Furthermore, because the hand-holding portion 35 has the curved-surface portion 35a at the side opposite to the side of the reading window 37, and because the depressions 38a and 38b are provided, the operator 60 can easily and comfortably hold the apparatus 32 by hand.

Figure 5A:
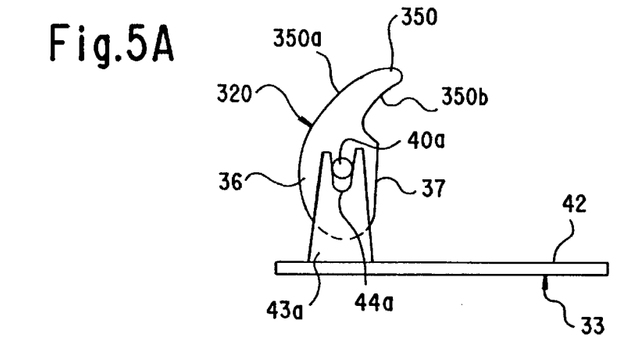
FIGS. 5A and 5B show a side elevational view of a second embodiment of the present invention.
Figure 5B:
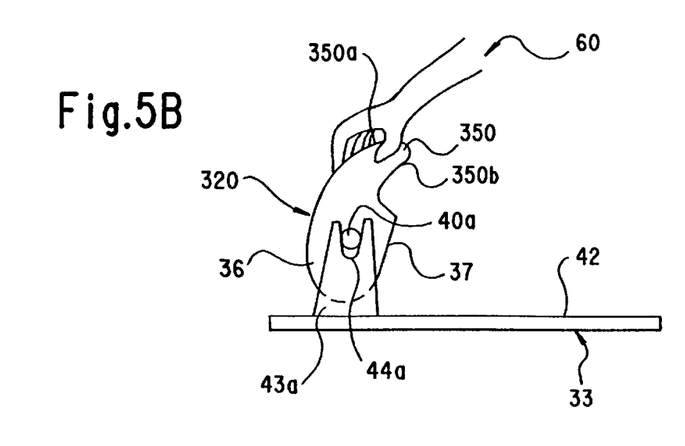

FIGS. 5A and 5B show side elevational views of a second embodiment of the present invention. In the bar-code reading apparatus 320 shown in FIG. 5A, the hand-holding portion 350 includes bent surfaces 350a and 350b which is formed to be bent toward an operator (the side of the reading window 37 and the side of the reading table 42). The arrangement of the second embodiment is otherwise similar to the arrangement of the first embodiment described above. As shown in FIG. 5B, when the operator 60 holds the barcode reading apparatus 32 and thus transfers it from the stationary condition to the hand-holding condition, the operator 60 can easily hold the hand-holding portion 350 from the nearer upper position.

Figure 6A:
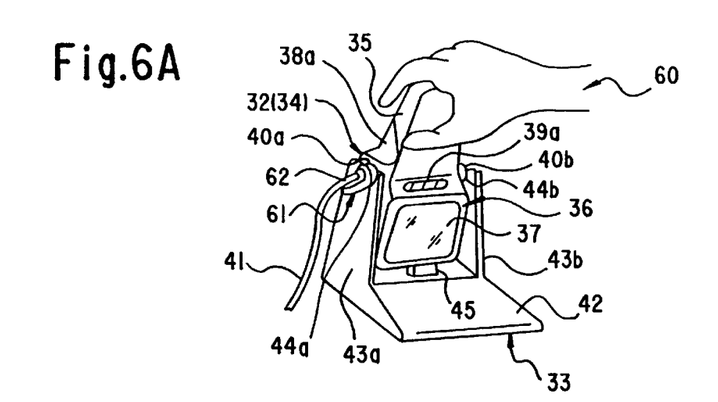
FIGS. 6A and 6B show perspective views of an arrangement of a third embodiment of the present invention.
Figure 6B:
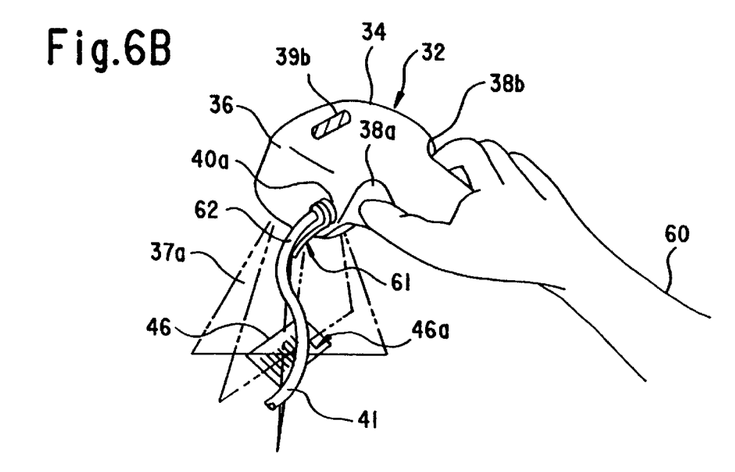

FIGS. 6A and 6B show perspective views of an arrangement of a third embodiment of the present invention. In the information reading apparatus 32 shown in FIG. 6A, the barcode reading apparatus 32 is provided with a supporting member 61 at the projection 40a portion from which the cable 41 extends. A maintaining portion 62 is formed in the supporting member 61. The maintaining portion 62 extends outward from the enclosure 34 so as to support the cable 41. The arrangement of the third embodiment is otherwise similar to the arrangement of the first embodiment. In this case, the supporting member 61 is freely fitted to the cable 41, and is rotatably attached to the projection 40a. The projection 40a is fixed to the enclosure 34.

Because the maintaining portion 62 of the supporting member 41 extends outward from the enclosure 34 as mentioned above, the cable 41, supported by the maintaining portion 62, extends outward from the enclosure 34 accordingly. In other words, a portion close to the enclosure of the cable is supported by maintaining portion 62 and, thereby, the cable 41 hangs down from the projecting end of the maintaining portion 62 at a position which is not close to the enclosure 34. Therefore, when the bar-code reading apparatus 32 is in the stationary condition on the stand 33 as shown in FIG. 6A, the cable 41 can be prevented from hanging in front of the reading window 37 so as to obstruct reading of bar code 46a through the reading window 37, by supporting the cable 41 outward and away from reading window 37. Similarly, when the apparatus 32 is in the hand-held condition where the reading window 37 faces downward as shown in FIG. 6B, the cable 41 can be prevented from hanging in front of the reading window 37 so as to obstruct reading of bar code 46a through the reading window 37. Thus, as shown in FIG. 6B, when the operator 60 holds the apparatus 32 in the hand-held condition and reads bar code 46a, the cable 41 is also prevented from hanging in front of the reading window 37. Thus, handling quality of the apparatus 32 can be improved, and effective reading of bar code 46a cab be easily achieved.

In the alternative, it is possible that the projection 40a is set to the enclosure 34 rotatably and the supporting member 61 is fixed to the projection 40a. In this case, a similar effect can be provided.

Figure 7A:
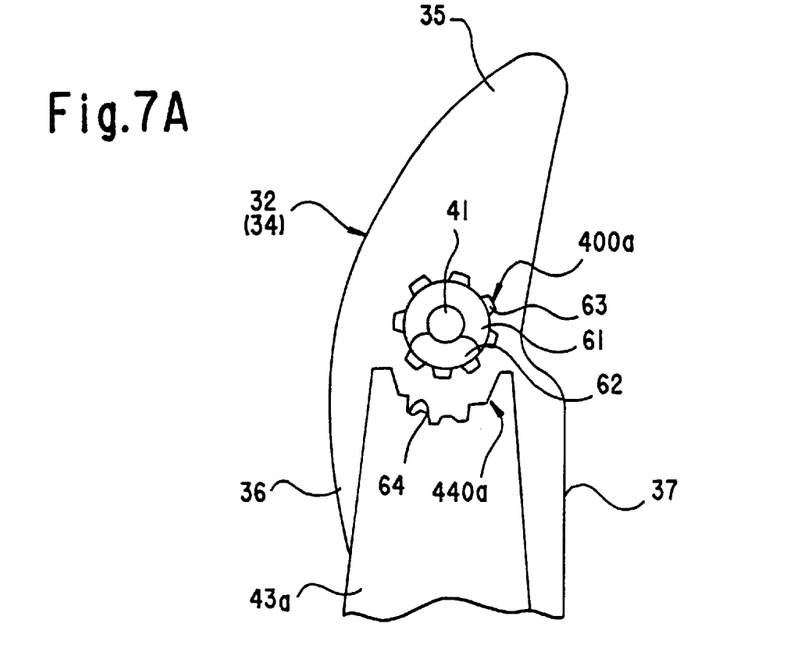
FIGS. 7A and 7B show an arrangement of a variant embodiment of the third embodiment.
Figure 7B:
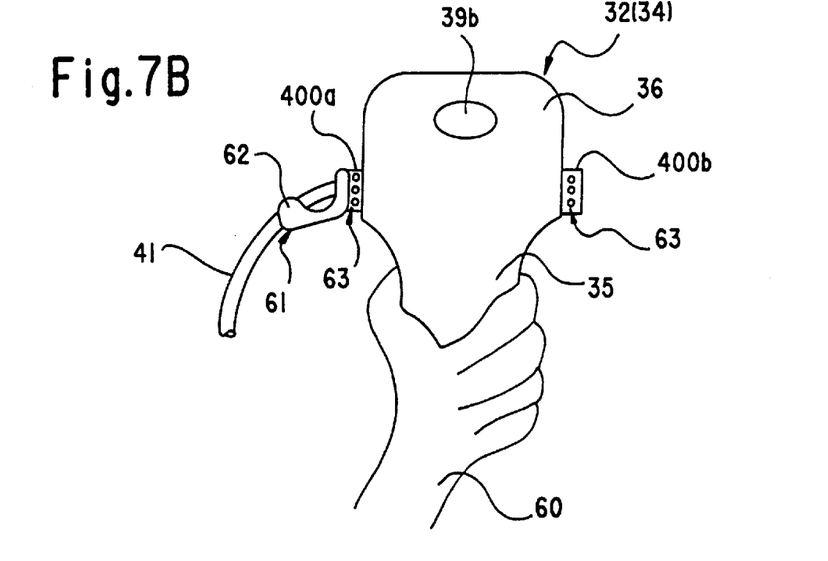

FIGS. 7A and 7B show a variant embodiment of the above-described third embodiment. FIG. 7A shows a partial approximate side elevational view of the variant embodiment, and FIG. 7B shows the variant embodiment in the hand-held condition. In the bar-code reading apparatus 32 shown in FIGS. 7A and 7B, the projections 400a and 400b are fixed to the enclosure 34. A plurality of projections 63 are formed on a circumferential surface of each of the projections 400a and 400b, and each of the projections 400a and 400b is thus shaped like portions of a gear. Fitting portions 64, acting as corresponding engagement portions to be fit to those projections 63, are formed in each of the supporting-point cut-out portions 440a and 440b of the supporting portions 43a and 43b of the stand 33. Thereby, the stopper 45 shown in FIG. 6 can be omitted. Except therefore, the arrangement of the variant embodiment is similar to the arrangement of the third embodiment shown in FIGS. 6A and 6B. In the variant embodiment, the supporting member 61 is set to the projection 400a rotatably.

In the variant embodiment shown in FIGS. 7A and 7B, when the barcode reading apparatus 32 is in the stationary condition on the stand 33, the projections 63 of the projections 400a and 400b are fitted to the fitting portions 64 of the supporting-point cut-out portions 440a and 440b of the supporting portions 43a and 43b in a state in which the apparatus 32 is positioned at a desired angle with respect to the stand 33. Thus, the apparatus 32 is maintained at the desired angle on stand 33. Thus, angle adjustment can be easily performed. In this case, the cable 41 is maintained in a position by the supporting member 61. Thereby, when the bar-code reading apparatus 32 is in the stationary condition on the stand 33, the position of apparatus 32 can be adjusting without having cable 41. Furthermore, when the apparatus 32 is in the hand-held condition, the cable 41 is maintained in a position by the rotatable supporting member and thus the cable 41 can be prevented from obstructing light emitted from the reading window 37 and/or light reflected by a bar code.

Figure 8:
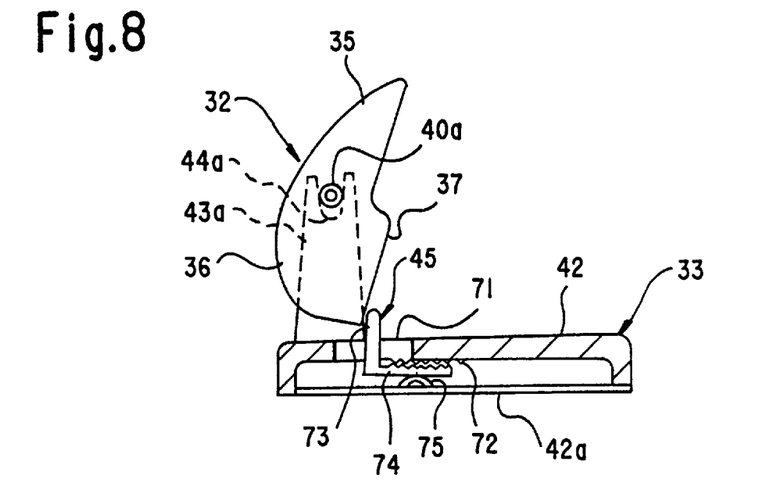
FIG. 8 shows a side elevational sectional view of a fourth embodiment of the present invention.

FIG. 8 shows a side elevational sectional view of a fourth embodiment of the present invention. In the information reading apparatus 32 shown in FIG. 8, an adjustment hole 71 is provided on the reading table 42 of the stand 33 in the proximity of the supporting portions 43a and 43b. Further, an internal rear surface of the reading table 42 has a depression and projection portion 72 formed therein. The stopper 45 is formed to have an L-shaped section, and includes a contact portion 73 and an engagement portion 74. The contact portion 73 is exposed above the reading table 42. The engagement portion 74 is located inside the reading table 42 and has depressions and projections formed therein for being fitted to the depression and projection portion 72.

Further, a spring 75 is provided on a bottom plate 42a of the reading table 42, and presses the engagement portion 74 of the stopper 45 onto the depression and projection portion 72 of the internal rear surface of the reading table 42. Except therefore, the arrangement of the fourth embodiment is similar to the arrangement of the first embodiment.

By moving the stopper 45 in the range of the adjustment hole 71, an operator can set the angle of the bar-code reading apparatus 32 (the reading window 37) to a desired angle. In this case, when the position of the stopper 45 is changed, the operator presses down the stopper 45 and causes the engagement between the depression and projection portion 72 and the engagement portion 74 to be released. The operator can slide the stopper 45 to a desired position. Thus, the position of the stopper 45 can be changed.

Thus, in the present invention, the enclosure provided with the mechanism for reading the optical mark has the reading window formed thereon and is shaped so that the reading window is located lower than a portion to be held by hand in the stationary condition. When the apparatus is lifted by an operator into the handheld condition, the operator merely needs to grab and lift the portion to be held by hand from the upper side. Thus, the handling quality can be improved. The present invention is also configured such that the portion to be held by hand is provided as the hand-holding portion separate from the reading window, and the hand-holding portion is formed to have the curved surface or to be bent towards the operator. Thereby, the operator can easily hold the hand-holding portion, and thus the handling quality can be improved.

The cable or wiring means of an embodiment of the invention, as discussed above, extends out from the side portion of the enclosure so that the operator can hold the enclosure. Further, the wiring means extends out from the supporting center of the enclosure so that, at the cable extending origin point, the axis of the cable is coincident with the supporting center of the enclosure. Therefore, as the enclosure is rotated about the supporting center, the cable merely turns about its axis accordingly but may not swing in an arc at the cable extending origin point. Further, the supporting member having the maintaining portion is provided to the enclosure rotatably. The maintaining portion maintains the wiring means in a preset position in an area adjacent the enclosure of the apparatus. Thereby, the wiring means can be prevented from obstructing the operator from holding the enclosure. Thus, the handling quality of holding can be improved.

The projections of the invention are formed at the two sides of the enclosure on a side of the center of gravity of the enclosure upon which the handle is disposed. The projections rotatably engage with the stand. The reading window is therefore always located lower than the portion to be held by hand in the stationary condition, since gravity will force the reading window to rotate downward, and the handle to rotate upward. Thus, the handling quality when holding can be improved.

One projection 40a or 400a of the projections (40a, 40b, or 400a, 400b) engaging with the stand 23 can be rotatably provided with the supporting member 61 and also is fixed to the enclosure 34, or the supporting member 61 is fixed to the projection 40a, or 400a and also the projection 40a or 400a can be rotatably provided to the enclosure 34. Further, for example, a corresponding engagement portion 63 is provided on the projection 400a for engaging with an engagement portion 64 of the stand 33. Thereby, the wiring means 41 can be maintained in a desired position in the maintaining portion 62 and the maintaining position in the maintaining portion can be rotated with respect to the stand 33 as the supporting member 61 is rotated with respect to the enclosure 34, or the stationary condition angle of the enclosure 34 can be changed and also the maintaining position in the maintaining portion 62 can be changed, individually. Rotation of supporting member 61 with respect to enclosure 34 is independent of rotation of enclosure 34 with respect to stand 33. Thus, the handling quality of the device can be improved.

The positioning member can also be provided to the stand, and the enclosure can be rotatably positioned. Thereby, it is possible to surely perform the optical mark reading in the stationary condition.

The indication portions of the invention can be provided, for indicating the optical mark reading, in the enclosure at the positions which are visible to an operator in the stationary condition and hand-held condition. Thereby the reading can be surely, easily recognized in either condition.

The reading window and the center of gravity of an embodiment of the invention are located in the same side of the enclosure with respect to the supporting center, as explained above. When an operator stops holding the enclosure, the enclosure is turned by gravity into an orientation in which the reading window is located below the supporting center. By providing the reading window so that the window surface thereof extends approximately vertically when the reading window is located below the supporting center, the reading window can then face a label to be read, with label being held in the side of said enclosure.

What is claimed is:

1. An information reading apparatus comprising:

a handle to be manually handled by an operator;

a reading portion in which a reading window is formed in its one side surface; and a depression formed in a boundary between said handle and said reading portion.

2. An information reading apparatus comprising:

a handle to be manually handled by an operator;

a reading portion which is integrally formed with said handle;

a reading window, in which light beam is emitted therethrough, formed in one side surface of said reading portion; and a depression formed in a boundary between said handle and said reading portion, wherein said handle is extended toward the longitudinal direction of said information reading apparatus, and the light beam is emitted in a direction which is perpendicular to the longitudinal direction of said information reading apparatus.

* * * * *